US009826392B2

(12) United States Patent
Timonen et al.

(10) Patent No.: US 9,826,392 B2
(45) Date of Patent: Nov. 21, 2017

(54) MANAGEMENT OF SUBSCRIBER IDENTITY MODULES

(71) Applicant: UROS TECHNOLOGY S.À R.L., Ettelbruck (LU)

(72) Inventors: Jukka Timonen, Oulu (FI); Marko Hakkarainen, Oulu (FI)

(73) Assignee: UROS TECHNOLOGY S.À.R.L., Ettelbruck (LU)

( * ) Notice: Subject to any disclaimer, the term of this patent is extended or adjusted under 35 U.S.C. 154(b) by 0 days.

(21) Appl. No.: 14/730,636

(22) Filed: Jun. 4, 2015

(65) Prior Publication Data
US 2015/0365816 A1 Dec. 17, 2015

(30) Foreign Application Priority Data

Jun. 12, 2014 (EP) ..................... 14172129

(51) Int. Cl.
*H04W 4/00* (2009.01)
*H04W 8/18* (2009.01)
(Continued)

(52) U.S. Cl.
CPC .......... *H04W 8/183* (2013.01); *H04B 1/3816* (2013.01); *H04L 12/1435* (2013.01);
(Continued)

(58) Field of Classification Search
CPC .......... H04W 4/26; H04W 8/18; H04W 8/183
(Continued)

(56) References Cited

U.S. PATENT DOCUMENTS 5,987,325 A  11/1999  Tayloe
6,178,335 B1  1/2001  Vu
(Continued)

FOREIGN PATENT DOCUMENTS

DE          198 23 074 A1    11/1999
DE     20 2010 005 832 U1     9/2010
(Continued)

OTHER PUBLICATIONS

Dec. 18, 2014 Search Report issued in European Patent Application No. 14 17 2129.
(Continued)

*Primary Examiner* — Wen Huang
(74) *Attorney, Agent, or Firm* — Oliff PLC

(57) ABSTRACT

Management of subscriber identity modules is disclosed. A server apparatus manages, in addition to or instead of mobile network operators, by a service provider, subscriptions to wireless communication networks. The server apparatus maintains subscriber identity module-specific usage records. Each usage record comprises a quantity quantifying amount of data transferred with each subscriber identity module and a limit setting the maximum allowed amount of data transfer for each subscriber identity module. The server apparatus compares periodically the quantity in each usage record with the limit in the same usage record, and if the quantity in the usage record is within a predetermined margin of the limit in the same usage record, transmits, with the data communication interface, to the mobile apparatus, a command to limit data transfer speed of the subscriber identity module defined by the usage record.

10 Claims, 6 Drawing Sheets

Figure 1:
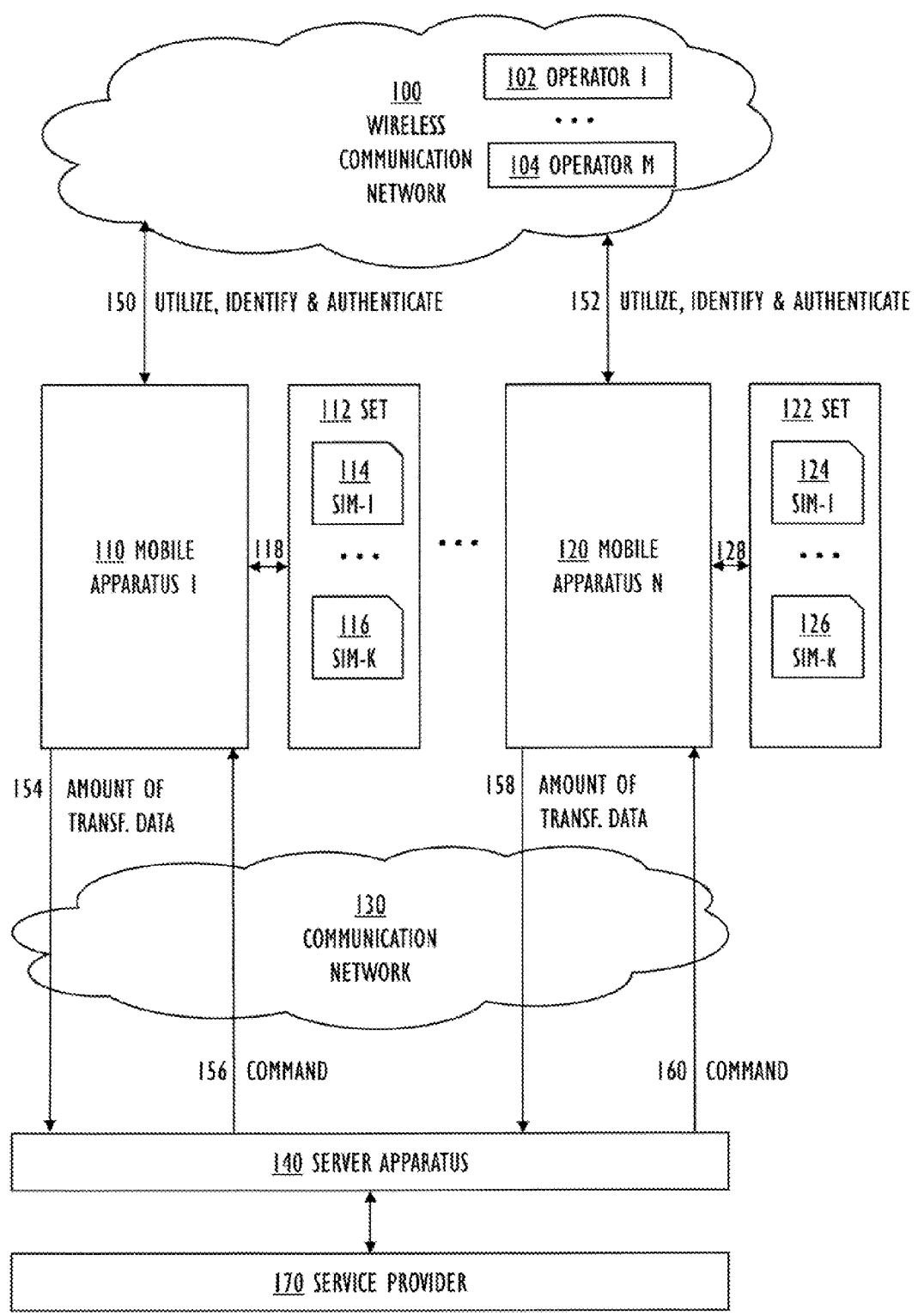

(51) Int. Cl.
*H04W 4/26* (2009.01)
*H04B 1/3816* (2015.01)
*H04W 24/08* (2009.01)
*H04W 72/04* (2009.01)
*H04L 12/14* (2006.01)
*H04W 88/06* (2009.01)

(52) U.S. Cl.
CPC ............ *H04W 4/26* (2013.01); *H04W 8/18* (2013.01); *H04W 24/08* (2013.01); *H04W 72/0493* (2013.01); *H04W 88/06* (2013.01)

(58) Field of Classification Search
USPC ........................................ 455/558, 407, 408
See application file for complete search history.

(56) References Cited

U.S. PATENT DOCUMENTS

| | | | |
|---|---|---|---|
| 6,366,777 | B1 | 4/2002 | Uusitalo |
| 6,584,326 | B1* | 6/2003 | Boydston ............ G06F 13/385 455/423 |
| 8,175,953 | B1 | 5/2012 | Titus et al. |
| 8,406,741 | B2 | 3/2013 | Kang et al. |
| 8,478,341 | B2 | 7/2013 | Torres |
| 8,576,901 | B2* | 11/2013 | Tat ........................ H04W 88/06 341/173 |
| 8,630,614 | B2 | 1/2014 | Korkiakoski et al. |
| 8,688,167 | B2 | 4/2014 | Joppek et al. |
| 8,965,363 | B1 | 2/2015 | Umamaheswaran et al. |
| 2003/0211840 | A1* | 11/2003 | Castrogiovanni ... H04M 15/745 455/405 |
| 2006/0172772 | A1 | 8/2006 | Bjorkner |
| 2007/0060200 | A1 | 3/2007 | Boris et al. |
| 2007/0224969 | A1 | 9/2007 | Rao |
| 2007/0259691 | A1 | 11/2007 | Santos Garcia |
| 2008/0119162 | A1 | 5/2008 | Sivalingam et al. |
| 2008/0137826 | A1 | 6/2008 | Aebi |
| 2009/0005041 | A1 | 1/2009 | Steinberg et al. |
| 2009/0061934 | A1* | 3/2009 | Hauck .................. H04W 8/265 455/558 |
| 2009/0131014 | A1 | 5/2009 | Mashinsky et al. |
| 2009/0186651 | A1 | 7/2009 | You |
| 2009/0233610 | A1 | 9/2009 | Paetsch |
| 2009/0247137 | A1 | 10/2009 | Awad |
| 2009/0298480 | A1 | 12/2009 | Khambete et al. |
| 2009/0325574 | A1 | 12/2009 | Izawa et al. |
| 2010/0240414 | A1 | 9/2010 | Lotenberg |
| 2010/0279698 | A1 | 11/2010 | Wong |
| 2010/0311404 | A1 | 12/2010 | Shi et al. |
| 2010/0311467 | A1* | 12/2010 | Wu ........................ H04W 8/205 455/558 |
| 2010/0330986 | A1 | 12/2010 | Rahman et al. |
| 2011/0117963 | A1* | 5/2011 | Wang .................... H04W 48/18 455/558 |
| 2011/0151832 | A1* | 6/2011 | Lai ........................ H04M 15/00 455/407 |
| 2011/0276442 | A1 | 11/2011 | Momtahan et al. |
| 2011/0306318 | A1 | 12/2011 | Rodgers et al. |
| 2012/0108200 | A1* | 5/2012 | Rubin .................... H04L 47/14 455/405 |
| 2012/0108204 | A1 | 5/2012 | Schell et al. |
| 2012/0115455 | A1 | 5/2012 | Rao |
| 2012/0196569 | A1 | 8/2012 | Holtmanns et al. |
| 2012/0207023 | A1 | 8/2012 | Tsuda |
| 2012/0214439 | A1* | 8/2012 | Yuan .................... H04L 12/141 455/405 |
| 2012/0302284 | A1 | 11/2012 | Rishy-Maharaj et al. |
| 2012/0315875 | A1* | 12/2012 | Breuer .................. H04W 12/06 455/411 |
| 2013/0023235 | A1 | 1/2013 | Fan et al. |
| 2013/0150112 | A1 | 6/2013 | Qi et al. |
| 2013/0156081 | A1 | 6/2013 | Tat et al. |
| 2013/0178187 | A1* | 7/2013 | Middleton ........ H04M 1/72563 455/405 |
| 2013/0260831 | A1* | 10/2013 | Uhari .................. H04M 1/0274 455/558 |
| 2013/0288748 | A1 | 10/2013 | Korkiakoski et al. |
| 2015/0256993 | A1 | 9/2015 | Bellamkonda et al. |

FOREIGN PATENT DOCUMENTS

| | | |
|---|---|---|
| EP | 1 357 732 A1 | 10/2003 |
| EP | 2 104 394 A1 | 9/2009 |
| EP | 2 618 599 A1 | 7/2013 |
| EP | 2 651 163 A1 | 10/2013 |
| EP | 2 661 129 A1 | 11/2013 |
| GB | 2473753 A | 3/2011 |
| WO | 01/54435 A1 | 7/2001 |
| WO | 2005/069660 A1 | 7/2005 |
| WO | 2008/045797 A2 | 4/2008 |

OTHER PUBLICATIONS

Nov. 11, 2014 Search Report issued in European Patent Application No. 14 17 2104.
U.S. Appl. No. 13/739,479, filed Jan. 11, 2013 in the name of Kokkonen et al.
U.S. Appl. No. 13/739,449, filed Jan. 11, 2013 in the name of Kokkonen et al.
U.S. Appl. No. 13/742,911, filed Jan. 16, 2013 in the name of Korkiakoski et al.
U.S. Appl. No. 13/851,405, filed Mar. 27, 2013 in the name of Korkiakoski et al.
U.S. Appl. No. 13/855,255, filed Apr. 2, 2013 in the name of Korkiakoski et al.
Feb. 10, 2017 Office Action issued in U.S. Appl. No. 14/730,862.
Nov. 3, 2016 Office Action Issued in U.S. Appl. No. 13/739,479.
"PRL Design, Maintenance and Testing," CDG Document 130, Version 1.1, Aug. 17, 2006.
Aug. 18, 2014 Office Action issued in European Patent Application No. 12 151 906.0.
May 31, 2012 European Search Report issued in European Patent Application No. 12 15 1906.
Jan. 7, 2015 Office Action issued in U.S. Appl. No. 13/739,479.
Aug. 6, 2014 Office Action issued in U.S. Appl. No. 13/739,479.
Jan. 21, 2015 Office Action issued in U.S. Appl. No. 13/855,255.
Aug. 25, 2014 Office Action issued in U.S. Appl. No. 13/855,255.
Sep. 17, 2012 Extended Search Report issued in European Patent Application No. 12 16 6131.
May 31, 2012 European Search Report issued in European Patent Application No. 12 15 1908.
Dec. 24, 2014 Office Action issued in U.S. Appl. No. 13/739,449.
May 13, 2015 Office Action issued in U.S. Appl. No. 13/739,449.
Jan. 30, 2015 Office Action issued in U.S. Appl. No. 13/851,405.
Sep. 5, 2012 European Search Report issued in European Patent Application No. 12 16 3858.
Jul. 25, 2012 European Search Report issued in European Patent Application No. 12 15 4706.
May 7, 2014 Office Action issued in U.S. Appl. No. 13/742,911.
Aug. 25, 2014 Office Action issued in U.S. Appl. No. 13/742,911.
U.S. Appl. No. 14/730,862, filed Jun. 4, 2015 in the name of Sakkinen. et al.
Sep. 18, 2017 Office Action issued in U.S Appl. No. 14/730,862.

* cited by examiner

MANAGEMENT OF SUBSCRIBER IDENTITY MODULES

FIELD

The invention relates to management of subscriber identity modules, especially in a server apparatus and in a mobile apparatus.

BACKGROUND

Five previous US patent applications by the Applicant, Ser. No. 13/739,479, Ser. No. 13/739,449, Ser. No. 13/742,911, Ser. No. 13/851,405, and Ser. No. 13/855,255, disclose various apparatuses utilizing a set of subscriber identity modules (SIM) for one user of a mobile apparatus. However, as the subscriber identity modules are not designed for such sophisticated use as sets, the management of multiple subscriber identity modules and their data transfer requires further ideas.

BRIEF DESCRIPTION

The present invention seeks to provide an improved server apparatus, and an improved mobile apparatus.

According to an aspect of the present invention, there is provided a server apparatus comprising: a data communication interface; one or more processors; and one or more memories including computer program code; the one or more memories and the computer program code configured to, with the one or more processors, cause the server apparatus at least to: manage, in addition to or instead of mobile network operators, by a service provider, subscriptions to wireless communication networks as specified by a set of subscriber identity modules; maintain subscriber identity module-specific usage records about utilization of the wireless communication networks by a mobile apparatus associated with the set of the subscriber identity modules, each usage record comprising a quantity quantifying amount of data transferred with each subscriber identity module and a limit setting the maximum allowed amount of data transfer for each subscriber identity module; compare periodically the quantity in each usage record with the limit in the same usage record; and if the quantity in the usage record is within a predetermined margin of the limit in the same usage record, transmit, with the data communication interface, to the mobile apparatus, a command to limit data transfer speed of the subscriber identity module defined by the usage record.

According to another aspect of the present invention, there is provided a mobile apparatus comprising: a data communication interface; one or more processors; and one or more memories including computer program code; the one or more memories and the computer program code configured to, with the one or more processors, cause the mobile apparatus at least to: transmit, with the data communication interface, to a server apparatus utilized by a service provider, information on the amount of the data transferred with subscriptions to wireless communication networks as specified by a set of subscriber identity modules obtained from mobile phone operators and associated with the mobile apparatus; and receive, with the data communication interface, a command to limit data transfer speed of a subscriber identity module, the command being a result of a comparison comparing periodically a quantity quantifying amount of data transferred in a subscriber identity module-specific usage record with a limit setting the maximum allowed amount of data transfer in the same usage record, and the result of the comparison being such that the quantity in the usage record is within a predetermined margin of the limit in the same usage record.

LIST OF DRAWINGS

Figure 3:
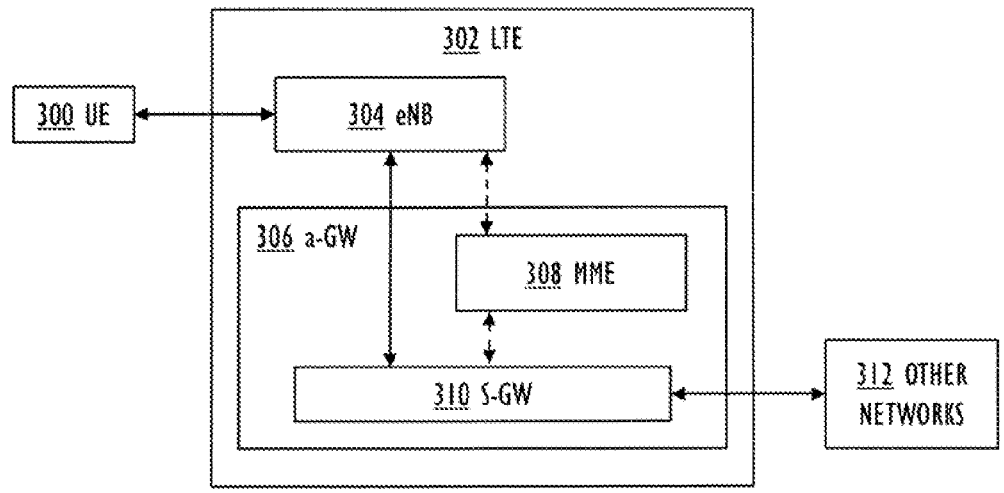
Figure 7:
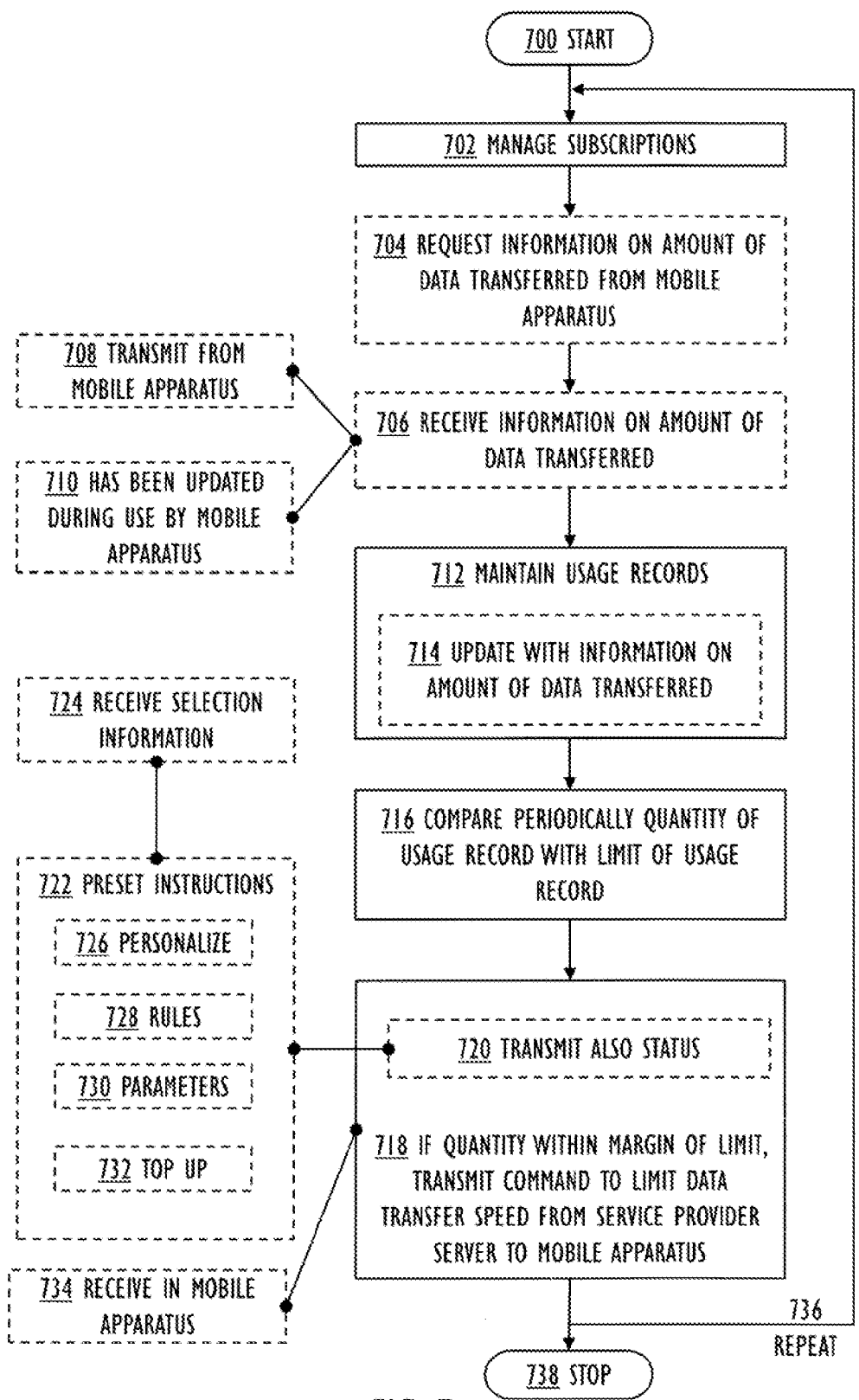

Example embodiments of the present invention are described below, by way of example only, with reference to the accompanying drawings, in which FIGS. 1, 2, 4, 5 and 6 illustrate example embodiments of a server apparatus and a mobile apparatus;

FIG. 3 illustrates an example embodiment of a wireless communication system; and FIG. 7 is a flow chart illustrating further example embodiments of both the server apparatus and the mobile apparatus.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of a mobile apparatus 110 and a server apparatus 140, they are simplified block diagrams that only show some structures and functional entities. The connections shown in these Figures are logical connections; the actual physical connections may be different. It is apparent to a person skilled in the art that the described mobile apparatus 110 and the server apparatus 140 may also comprise other functions and structures. It should be appreciated that details of some functions, structures, and the protocols used for communication are irrelevant to the actual invention. Therefore, they need not be discussed in more detail here. Although the mobile apparatus 110 and the server apparatus 140 have been depicted as comprising separate single entities, different parts may be implemented in one or more physical or logical entities; it all depends on design choices and the required level of integration.

FIG. 1 illustrates example embodiments of an operation environment. Mobile apparatuses 110, 120 utilize a wireless communication network 100 with the help of a server apparatus 140. The mobile apparatuses 110, 120 communicate 154, 156, 158, 160 over a communication network 130 with each other. The communication network 130 may or may not comprise a part of the wireless communication network 100.

Figure 2:
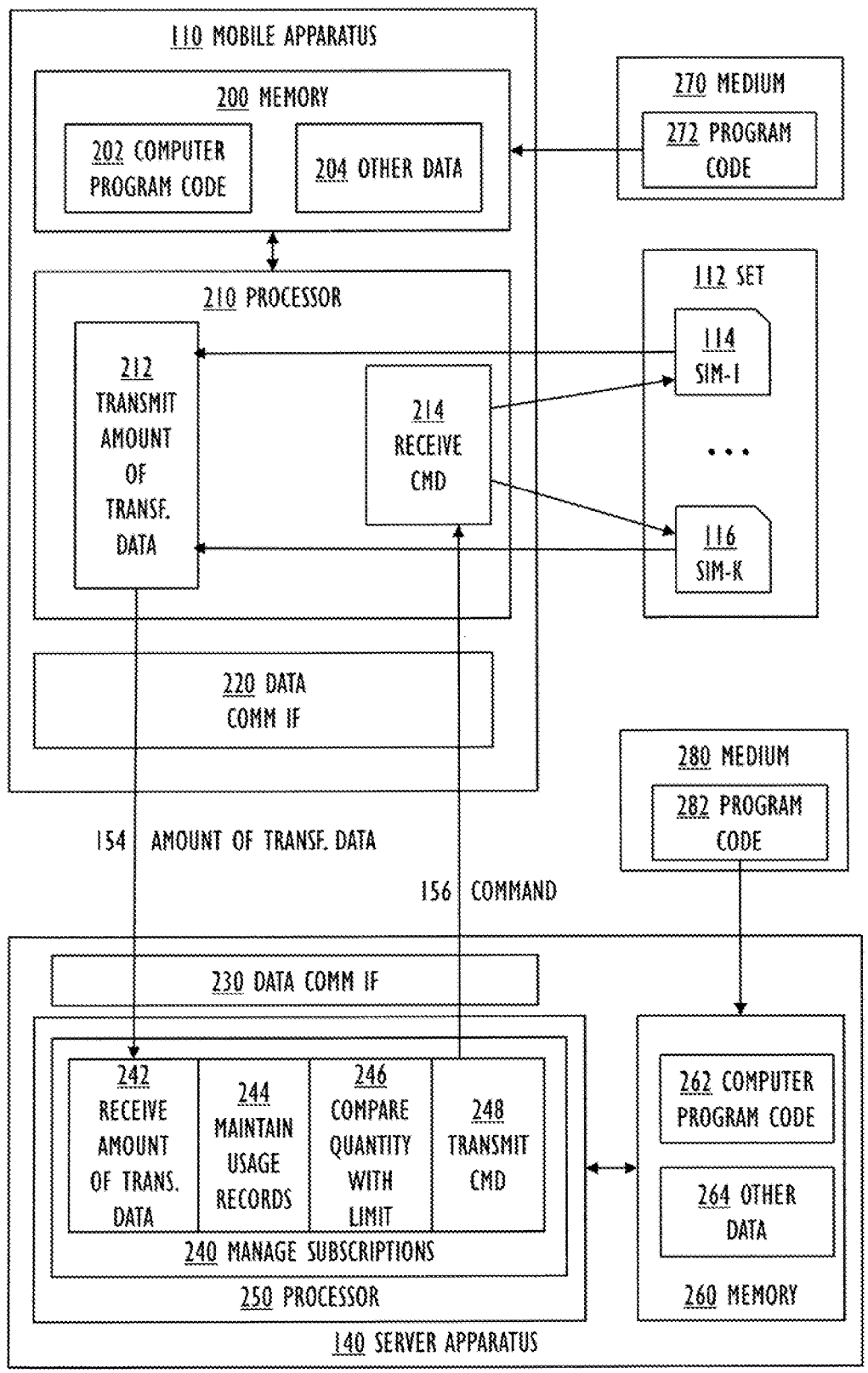

FIG. 2 illustrates the structures of the mobile apparatus 110 and the server apparatus 140 in more detail.

As shown in FIG. 1, each mobile apparatus 110, 120 comprises an interface 118, 128 to a set 112, 122 of subscriber identity (SIM) modules 114, 116, 124, 126 of the wireless communication network 100. The interface 118, 128 may or may not include a (contact) smart card reader capable of reading the subscriber data through the contacts of the integrated circuit.

The number of the mobile apparatuses 110, 120 may vary from 2 to N, wherein N is any integer greater than two.

The number of the subscriber identity modules 114, 116, 124, 126 may vary according to the circumstances, but there are at least three subscriber identity modules 114, 116, 124, 126 in each set 112, 122. One subscriber identity module may be a default subscriber identity module used normally (in user's home location or in a network where he/she has the coverage of the default subscriber identity module, for example). The number of the subscriber identity modules 114, 116, 124, 126 in each set 112, 122 may vary from 3 to K, wherein K is any integer greater than three.

In an example embodiment, the subscriber identity module 114, 116, 124, 126 is an integrated circuit storing subscriber data, which is network-specific information used to authenticate and identify subscribers on the network 100. The subscriber identity module 114, 116, 124, 126 may be embedded into a removable SIM card. First SIM cards were of credit card size, 85.60 mm×53.98 mm×0.76 mm, but a newer mini-SIM card is considerably smaller, 25 mm×15 mm×0.76 mm, or a micro-SIM card is even smaller, 15 mm×12 mm×0.76 mm. However, these measures are only example embodiments. It is also to be noted than one physical SIM card may include a number of different subscriptions: one SIM card may be a multi-IMSI SIM card having many different subscriber identities in the same card. Even a virtual subscriber identity module 114, 116, 124, 126 is feasible: it is a mobile phone number provided by a mobile network operator 102, 104 that does not require a SIM card to connect phone calls to the user's mobile terminal. In such a scenario, a memory of the mobile apparatus 110, 120 may be used to store subscriber data of the virtual subscriber identity module 114, 116, 124, 126 as required.

The subscriber identity modules 114, 116, 124, 126 may include data enabling utilization 150, 152 of the wireless communication network 100 such as data relating to subscriber identification and authentication. Data relating to the subscriber identity modules 114, 116, 124, 126 may include, for example, preferred roaming lists, a unique serial number (Integrated Circuit Card Identifier, ICCID) of the SIM card, internationally unique number of the subscriber (International Mobile Subscriber Identity, IMSI), security authentication and ciphering information for the subscriber (such as an authentication key Ki), temporary information related to the local network, a list of the services the subscriber has access to, an operator-specific emergency number, two passwords (personal identification number, PIN, for ordinary use, and PIN unlock code, PUK, for PIN unlocking), and other required data. The subscriber data may also include other carrier-specific data such as the short message service centre (SMSC) number, service provider name (SPN), service dialling numbers (SDN), advice-of-charge parameters, and value added service (VAS) applications. Further information may be found in the GSM Technical Specification 11.11.

Besides being called subscriber identity module, also other names and abbreviations may be used to refer to subscriptions. USIM (Universal Subscriber Identity Module) is an application for UMTS running on a UICC (Universal Integrated Circuit Card). The USIM is a logical entity on the physical card storing user subscriber information, authentication information, text messages, and phone book contacts. For authentication purposes, the USIM stores a long-term pre-shared secret key, which is shared with the Authentication Centre (AuC) in the network. The USIM also verifies a sequence number that must be within a range using a window mechanism to avoid replay attacks, and is in charge of generating the session keys to be used in the confidentiality and integrity algorithms of the KASUMI block cipher in UMTS. The equivalent of USIM on CDMA networks is CSIM.

The wireless communication system 100 may be any standard/non-standard/proprietary radio system that supports the use of the subscriber identity modules 114, 116, 124, 126. In the present, such a system may be any mobile telephone system, regardless of the generation (such as 2G, 3G, 4G, beyond 4G, etc.). Consequently, the wireless communication system may be GSM (Global System for Mobile Communications), WCDMA (Wideband Code Division Multiple Access), TD-SCDMA (Time Division Synchronous Code Division Multiple Access), or evolved universal terrestrial radio access (E-UTRA), also known as long term evolution (LTE) for example, or its recent LTE-Advanced versions (LTE-A). However, the example embodiments are not restricted thereto, but may be applicable to other suitable radio systems (in their present forms and/or in their evolution forms), such as universal mobile telecommunications system (UMTS) radio access network (UTRAN or EUTRAN), a system based on International Mobile Telecommunication (IMT) standard or any one of its evolution versions (e.g. IMT-Advanced), wireless local area network (WLAN) based on IEEE (Institute of Electrical and Electronics Engineers) 802.11 standard or its evolution versions (IEEE 802.11ac), worldwide interoperability for microwave access (WiMAX), Wi-Fi, 3GPP, Bluetooth®, or personal communications services (PCS).

As the mobile apparatus 110, 120 has the interface 118, 128 to the set 112, 122 of the subscriber identity modules 114, 116, 124, 126 the wireless communication network 100 accessible may be operated by one to M operators 102, 104, wherein M is any integer greater than one.

The operator (also known as mobile phone operator, mobile network operator, wireless service provider, wireless carrier, cellular company, or mobile network carrier) 102, 104 is a telephone company providing services for the subscriber. Some examples of the mobile phone operators include: China Mobile, Vodafone, Orange, TeliaSonera, T-Mobile, Verizon Wireless etc. The mobile phone operator 102, 104 gives the subscriber identity modules 114, 116, 124, 126 to the user, who inserts it into the mobile apparatus 110, 120 to gain access to the service. In the described embodiments, the mobile phone operators 102, 104 may first supply a service provider 170 with at least some of the subscriber identity modules 114, 116, 124, 126, whereupon the service provider assembles a suitable set of the subscriber identity modules 114, 116, 124, 126, possibly with the mobile apparatus 110, 120 and gives them to the end-user for use. Other ways of supplying the subscriber identity modules 114, 116, 124, 126 to the end-user are also feasible: the service provider 170 may give one or more subscriber identity modules 114, 116, 124, 126 to the end-user who will set them to the mobile apparatus 110, 120, for example. The mobile phone operator 102, 104 may either own the underlying network and spectrum assets required to run the service, or the mobile phone operator may be a virtual one, buying wholesale service from the mobile phone operator owning the underlying network and spectrum assets and selling on to its own customers. Even though connections between the subscriber identity modules 114, 116, 124, 126 and the operator infrastructure 102, 104 are not shown in FIG. 2, it is clear that such connections exist, as the subscriber identity modules 114, 116, 124, 126 remain, in general, under management of the operators; the service provider 170 only supports their flexible use under varying circumstances.

The service provider 170 may be an independent supplier/vendor obtaining the subscriber identity modules 114, 116, 124, 126 from various network operators 102, 104 and compiling them into the sets 112, 122 marketed and sold to end-users (=subscribers).

In an example embodiment, the sets 112, 122 of the subscriber identity modules 114, 116, 124, 126 comprise prepaid subscriber identity modules obtained from various mobile phone operators 102, 104.

FIG. 3 illustrates an example of the radio system 302, LTE. The three basic elements of the radio system 302 are UE 300 (=mobile terminal), eNB (=base station) 304 in a radio network and an access gateway (a-GW) 306 in a core network. In such a division, the mobile apparatus 110 is either in the UE 300 or coupled to it, but not in the eNB 304 or in the a-GW 306.

The base station 304 may be called, depending on the system, a Node B, enhanced or evolved NodeB (eNB), a home eNode B (HeNB), an access point (AP), an IEEE 802.11 based access point, a femto node, a femto base station, or any other equipment belonging to the network infrastructure of the wireless communication network 100, and implementing the radio communication interface with the mobile terminal 300. Functionalities of the eNB 304 may include: all radio protocols, mobility management, all retransmissions, header compression, and packet data convergence protocols. The a-GW 306 provides the interface of the cellular radio system 302 to/from the other networks 312 such as the Internet. The a-GW 306 may be streamlined by separating the user and the control planes: a mobility management entity (MME) 308 is just a control plane entity and the user plane bypasses MME 308 directly to a serving gateway (S-GW) 310.

As illustrated in FIG. 2, the mobile apparatus 110 comprises a data communication interface 220, one or more processors 210, and one or more memories 200 including computer program code 202. Also the server apparatus 140 comprises a data communication interface 240, one or more processors 250, and one or more memories 260 including computer program code 262. The one or more memories 200 and the computer program code 202 of the mobile apparatus 110 are configured to, with the one or more processors 210, cause the mobile apparatus 110 to perform various operations to be explained. The one or more memories 260 and the computer program code 262 of the server apparatus 140 are configured to, with the one or more processors 250, cause the server apparatus 140 to perform various operations to be explained.

Figure 4:
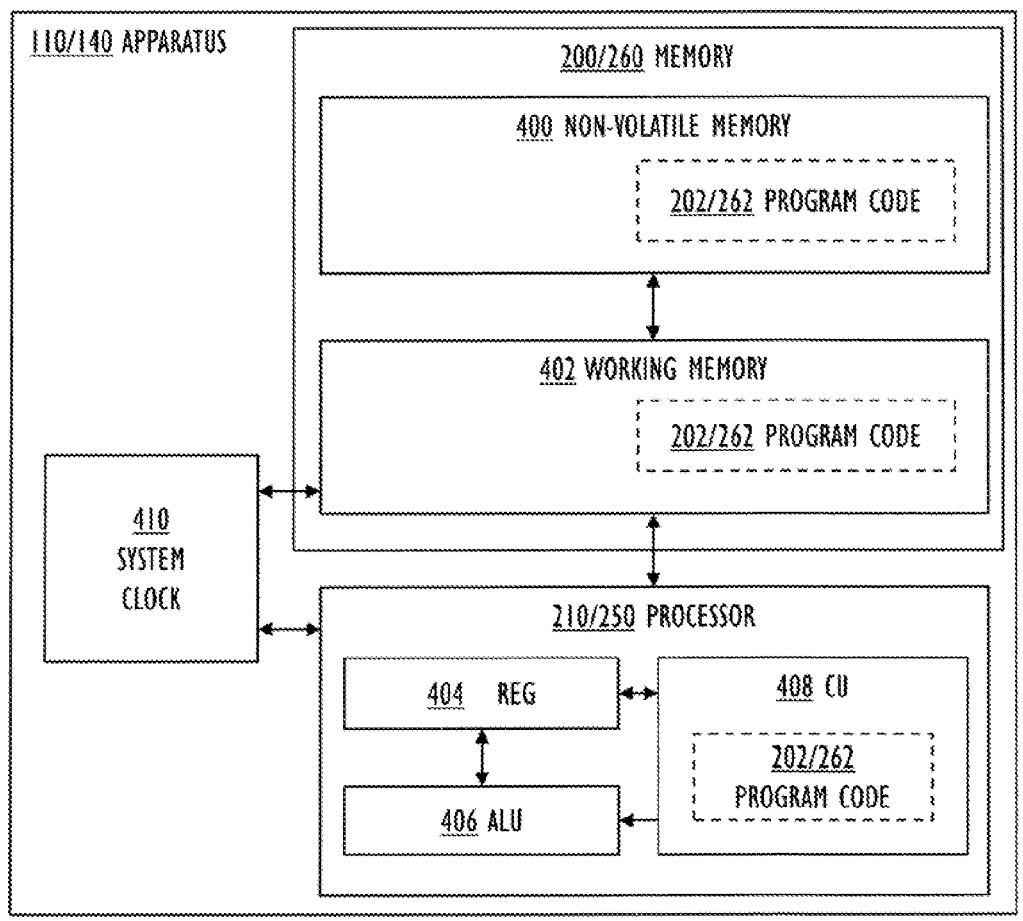

In an example embodiment illustrated in FIG. 4, the mobile apparatus 110 and/or the server apparatus 140 may be an electronic digital computer, which may comprise, besides the processor 210/250, a non-volatile memory 400 and a working memory 402 as the memory 200/260, and a system clock 410. Naturally, the computer may comprise a number of other peripheral devices, not illustrated here for the sake of clarity.

The term 'processor' 210/250 refers to a device that is capable of processing data. Depending on the processing power needed, the apparatus 110/140 may comprise several processors 210/250 such as parallel processors or a multi-core processor. When designing the implementation of the processor 210/250, a person skilled in the art will consider the requirements set for the size and power consumption of the apparatus 110/140, the necessary processing capacity, production costs, and production volumes, for example. The processor 210/250 and the memory 200/260 may be implemented by an electronic circuitry.

In an example embodiment, the system clock 402 constantly generates a stream of electrical pulses, which cause the various transferring operations within the computer to take place in an orderly manner and with specific timing.

In an example embodiment, the processor 210/250 may be implemented as a microprocessor implementing functions of a central processing unit (CPU) on an integrated circuit. The CPU is a logic machine executing a computer program code 202/262. The program code 202/262 may be coded as a computer program using a programming language, which may be a high-level programming language, such as C, or Java, or a low-level programming language, such as a machine language, or an assembler. The CPU may comprise a set of registers 404, an arithmetic logic unit (ALU) 406, and a control unit (CU) 408. The control unit 408 is controlled by a sequence of the program code 202/262 transferred to the CPU from the working memory 402. The control unit 408 may contain a number of microinstructions for basic operations. The implementation of the microinstructions may vary, depending on the CPU design. The microprocessor 210/250 may also have an operating system (a dedicated operating system of an embedded system, or a real-time operating system), which may provide the computer program code 202/262 with system services.

A non-exhaustive list of implementation techniques for the processor 210/250 and the memory 200/260 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The computer program code 202/262 may be implemented by software and/or hardware. In an example embodiment, the software may be written by a suitable programming language, and the resulting executable code 202/262 may be stored on the memory 200/260 and run by the processor 210/250.

In an example embodiment, the functionality of the hardware may be designed by a suitable hardware description language (such as Verilog or VHDL), and transformed into a gate-level netlist (describing standard cells and the electrical connections between them), and after further phases the chip implementing the processor 210, memory 200 and the code 202 of the mobile apparatus 110 may be fabricated with photo masks describing the circuitry.

In an example embodiment, the processor 210 and the memory 200 of the mobile apparatus 110 are a part of a microcontroller.

The working memory 402 and the non-volatile memory 400 may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

In an example embodiment, described in FIG. 2, the data communication interface 220, processor 210 and memory 200 are separate entities, communicatively coupled together by an appropriate serial bus, for example. In general interfaces between the various elements may be implemented with suitable interface technologies, such as a message interface, a method interface, a sub-routine call interface, a block interface, an appropriate serial/parallel bus, or any hardware/software means enabling communication between various sub-units of the mobile apparatus 110. However, in another example embodiment, there may not be a separate application processor, but the processor 210 and the memory 200 are located in a radio module together with the data communication interface 220 and a wireless transceiver.

An example embodiment illustrated in FIG. 2 provides a computer-readable medium 270, 280 for the mobile apparatus 110 and/or the server apparatus 140 comprising the computer program code 272, 282. Said computer program code 272, 282, when executed on the apparatus 110, 140, causes the apparatus 110, 140 to perform the operations required to implement the described example embodiments. In an example embodiment, the computer program code 272, 282 may be in source code form, object code form, executable file, or in some intermediate form. The computer-readable medium 270, 280 may comprise at least the following: any entity or device capable of carrying computer program code 272, 282 to the apparatus 110, 140, a record medium, a computer memory, a read-only memory, an electrical carrier signal, a telecommunications signal, and a software distribution medium. In some jurisdictions, depending on the legislation and the patent practice, the computer-readable medium 270, 280 may not be the telecommunications signal. In an example embodiment, the computer-readable medium 270, 280 may be a non-transitory computer readable storage medium.

In an example embodiment, the server computer 140 is any computing resource capable of processing information relating to the sets 112, 122 of the subscriber identity modules 114, 116, 124, 126 as a computer, a server computer, a cluster of computers, a computing cloud, a centralized computing resource, or a distributed computing resource, for example. In an example embodiment, the server apparatus 140 is the server part of the client-server computing model that acts as distributed application which partitions tasks or workloads between the provider of a resource or service, called the server 140, and the service requester, called the client 110, 120. The server apparatus 140 may be a host that is running one or more server programs which share their resources with clients 110, 120. The server apparatus 140 may also operate according to the cloud computing model implementing the network-based service, which appears to be provided by real hardware, but is in fact provided by virtual hardware, simulated by software running on one or more real computers. Naturally, besides these example embodiments of the server apparatus 140, other feasible computing architectures may be utilized as well to implement the hardware and software of the server apparatus 140. Consequently, besides operating according to the client/server architecture, push technology may be utilized as well. In push technology, the request for a transaction is initiated by the server apparatus 1400, whereas with the pull technology the request for the information is initiated by mobile apparatus 110, 120 (as in the client-server model).

Figure 5:
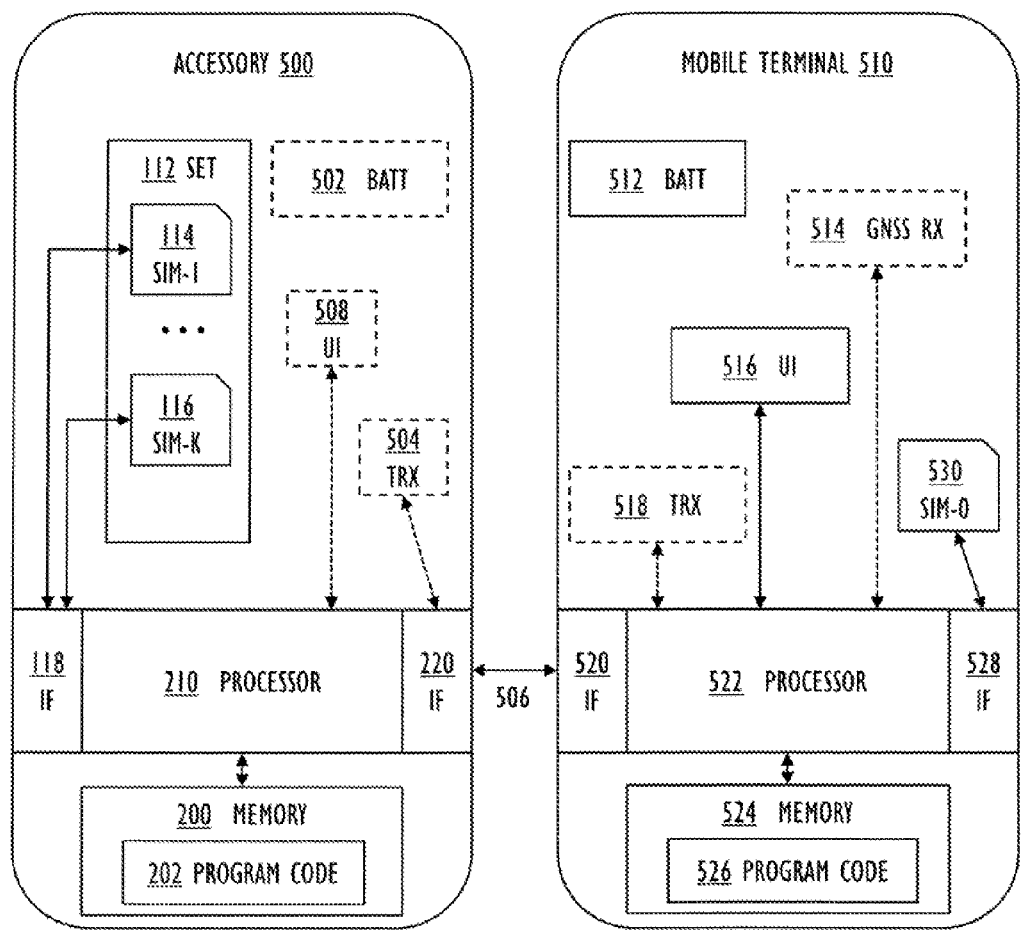

FIG. 5 illustrates an example embodiment wherein the mobile apparatus 110 functionality is implemented in an accessory 500 of a mobile terminal 510. Consequently, the accessory 500 accommodates the set 112 of the subscriber identity modules 114, 116, and comprises one or more processors 210 and one or more memories 200 with the computer program code 202.

The accessory 500 may or may not comprise a battery 502, depending on the power requirements of the accessory 500 and the possibility to obtain electric energy from an external source such as the mobile terminal 510. The (rechargeable) electrical battery 502 may be one or more electrochemical cells that convert stored chemical energy into electrical energy. Instead of the battery 502, other suitable accumulator means may be used to store energy.

The interface 118 to the subscriber identity modules 114, 116 is within the accessory 500, but also another interface 528 to the subscriber identity module 530 possibly located in the mobile terminal 510 may be applicable.

Furthermore, both the mobile terminal 510 and the accessory 500 comprise a wired/wireless standard/proprietary communication protocol interface 220, 520 enabling two-way communication 506 between the mobile terminal 510 and the accessory 500. In an example embodiment, the interface 204, 220 is implemented as a serial or parallel communication bus, hardware line, an USB (Universal Serial Bus) cable with appropriate connectors, a SIM bus according to ISO/IEC 7816-3, a wireless Bluetooth link, a wireless WLAN (Wireless Local Area Network) link, a wireless Wi-Fi (Wireless Fidelity) link, a serial bus such as UART (Universal Asynchronous Receiver/Transmitter), I²C (Inter-Integrated Circuit) or SPI (System Packet Interface). The data relating to the subscriber identity module 114, 116 and the data relating to the mobile terminal 510 may be transferred between the mobile terminal 510 and the accessory 500 through the interfaces 220, 520.

In an example embodiment, the mobile terminal 510 may be a mobile wireless communications terminal employing a transceiver 518 capable of communicating with the wireless communication network 100. However, in another example embodiment, the mobile terminal 510 does not itself comprise a wireless transceiver 518, but, instead, the mobile terminal 510 communicates through a wireless transceiver 504 of the accessory 500. Accordingly, the mobile terminal 510 may be a portable computer, a tablet computer, or any other suitable mobile terminal capable of taking advantage of the set 112 of the subscriber identity modules 114, 116, but not necessarily itself including a transceiver capable of communicating with a wireless communication system 100.

In an example embodiment, the mobile terminal 510 is a computer, laptop computer, tablet computer, phablet, mobile phone, smartphone, general-purpose mobile computing device, or some other electronic apparatus enabling user interaction, for example. In an example embodiment, the mobile terminal 510 is a general-purpose off-the-shelf computing device, as opposed to a purpose-build proprietary equipment, whereby research & development costs will be lower as only the special-purpose software (and not the hardware) needs to be designed, implemented and tested. In an example embodiment, the mobile terminal 510 is a smartphone or a tablet employing a multi-touch display and a suitable operating system such as iOS, Android, or Windows Phone, for example. In an example embodiment, the mobile terminal 510 may comprise a default subscriber identity module 530, a user interface 516, a battery 512, one or more processors 522 and one or more memories 524 with computer program code 526.

The user interface 516 may comprise a display, means for producing sound, a keyboard, and/or a keypad, for example. The display may be a liquid crystal display, for example, but it may also be implemented by any appropriate prior art technique, such as with an active-matrix organic light-emitting diode. The display may also incorporate other user interaction means, such as touch input, or haptic feedback, i.e. the display may be a touch screen. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 516 may comprise other user interface elements, for example various means for focusing a cursor (mouse, track ball, various arrow keys, touch sensitive area etc.) or elements enabling audio control. A parameter, setting or command relating to the described processing of the subscriber identity modules 114, 116 may be manipulated with the user interface 516.

Furthermore, the mobile terminal 510 may comprise a positioning receiver 514 receiving external location information, which may be utilized to generate location of the mobile terminal 510. The positioning receiver 514 may be a receiver of a global navigation satellite system (GNSS). Such a system may be the Global Positioning System (GPS), the Global Navigation Satellite System (GLONASS), the Galileo Positioning System (Galileo), the Beidou Navigation System, The Quasi-Zenith Satellite System (QZSS), or the Indian Regional Navigational Satellite System (IRNSS), for example. The positioning receiver 514 determines its location (longitude, latitude, and altitude) using signals transmitted from satellites orbiting the earth. Besides global navigation satellites, the positioning receiver 514 may also determine its location by utilizing other known positioning techniques. It is well known that by receiving radio signals from several different base stations, a mobile phone may determine its location, for example.

In the example embodiment of FIG. 5, the accessory 500 does not comprise a user interface of its own, but the user interaction is performed through the user interface 516 of the mobile terminal 510 as data may be transferred between the accessory 500 and the mobile terminal 510 through the interfaces 220, 520. However, in another example embodiment, the accessory 500 may comprise a user interface 508 as well for outputting and/or inputting data relating to the described processing of the subscriber identity modules 114, 116.

In the example embodiment of FIG. 5, the mobile apparatus 110 functionality may be implemented in the accessory 500 such that the computer program code 202 is run in the one or more processors 210 of the accessory 500. However, also such an example embodiment is feasible wherein a part of the mobile apparatus 110 functionality is implemented in the mobile terminal 510 as well such that a part of the computer program code is also run in the at one or more processors 522 of the mobile terminal 510.

In an example embodiment, the accessory 500 comprises a wireless transceiver 504 coupled with the data communication interface 220, whereby the accessory 500 may communicate directly with the server apparatus 140 without having to pass the information through the mobile terminal 510 (even if the mobile terminal comprises the wireless transceiver 518).

In an example embodiment, the accessory 500 is a kind of container including the subscriber identity modules 114, 116 to be used by the mobile terminal 510, but the required processing is performed only in the one or more processors 522 of the mobile terminal 510, i.e. the accessory 500 does not comprise the processor or the memory with the computer program code. The data relating to the subscriber identity modules 114, 116 may be transferred from the accessory 500 to the mobile terminal 510 through the interfaces 220, 520.

In an example embodiment the mobile apparatus 110 functionality is implemented in an accessory 500 acting as a USB (Universal Serial Bus) modem. The USB modem 500 may or may not comprise a battery, depending on the power requirements of the USB modem 500 and the possibility to obtain electric energy from an external source such as a mobile terminal 510. Furthermore, the USB modem 500 comprises a USB interface 220 capable of being coupled 506 through a USB cable and appropriate connectors to a USB interface 520 of the mobile terminal 510.

Figure 6:
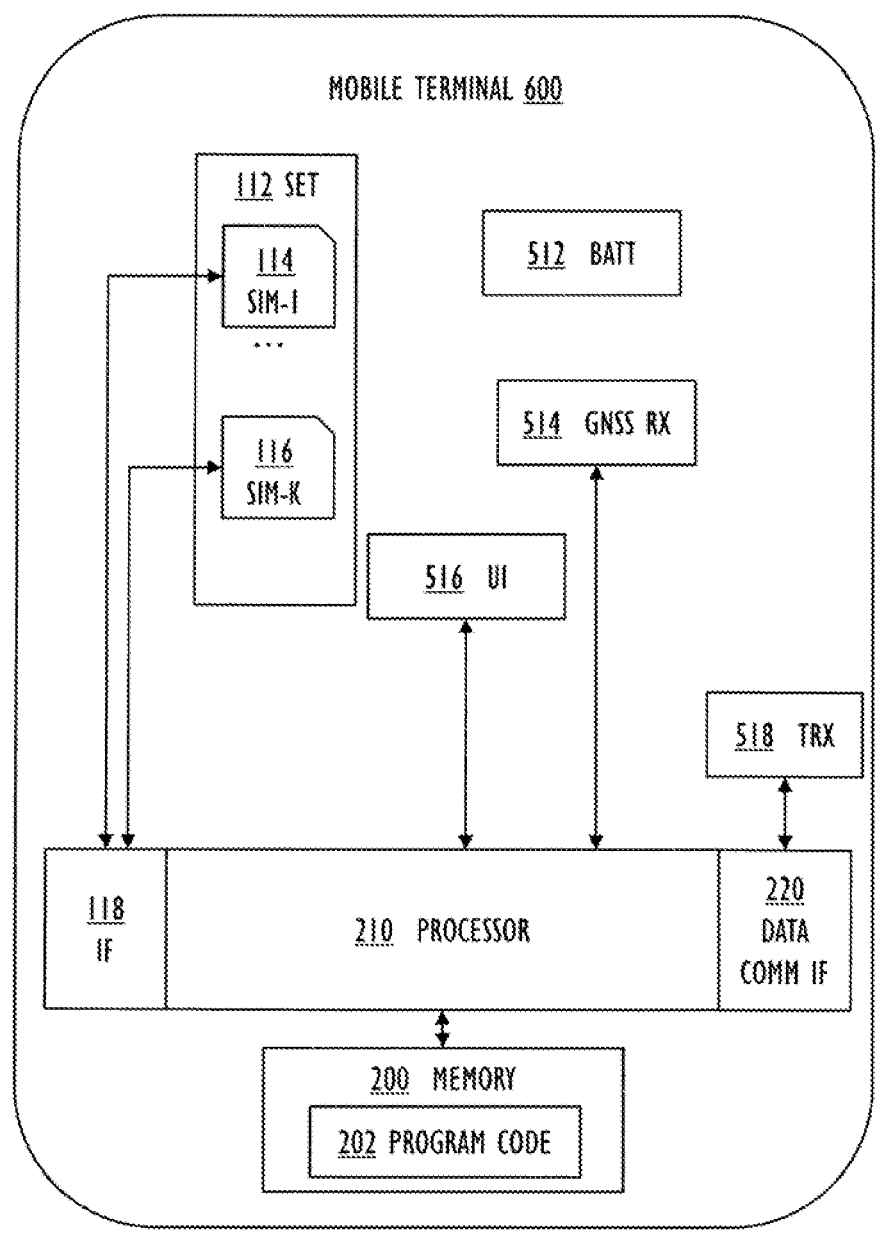

FIG. 6 illustrates an example embodiment wherein the mobile apparatus 110 functionality is implemented to a mobile terminal 600. Consequently, the mobile terminal 600 comprises the interface 118 to the set 112 of the subscriber identity modules 114, 116 of the wireless communication system 100, the one or more processors 210, and the one or more memories 200 storing the computer program code 202. The mobile terminal 600 may also comprise at least some of the other parts 512, 514, 516, 518, 528, 530.

To summarize, in an example embodiment, the mobile apparatus 110, 120 comprises at least one of the following: a mobile wireless communications terminal 600, an accessory 500 of a mobile wireless communications terminal 510, a combination of a mobile wireless communications terminal 510 and an accessory 500 of the mobile wireless communications terminal 510, an accessory of a mobile terminal 500, a combination of a mobile terminal 510 and an accessory 500 of the mobile terminal 510, a Universal Serial Bus USB modem 500. Furthermore, in an example embodiment, each set 112, 122 of the subscriber identity modules 114, 116, 124, 126 is accommodated by a mobile terminal 600 and/or an accessory 500 of a mobile terminal 510.

Now that the operation environment, the mobile apparatus 110 and the server apparatus 140 have been described, we may continue by describing the dynamic functionality of the mobile apparatus 110 and the server apparatus 140 with reference to FIG. 2.

The mobile apparatus 110 and the server apparatus 140 perform a six-step sequence of message exchanges and processing in order to improve the management of the subscriber identity module 111, 116 for utilizing the wireless communication networks 100.

First, the mobile apparatus 110 is caused to transmit 212, with the data communication interface 220, to the server apparatus 140 utilized by the service provider 170, information on the amount of the data transferred with subscriptions to the wireless communication networks 100 as specified by the set 112 of the subscriber identity modules 114, 116 obtained from mobile phone operators 102, 104 and associated with the mobile apparatus 110.

Second, the server apparatus 140 is caused to manage 240, in addition to or instead of the mobile network operators 102, 104, by the service provider 170, subscriptions to the wireless communication networks 100 as specified by the set 112 of the subscriber identity modules 114, 116.

Third, the server apparatus 140 is caused to maintain 244 subscriber identity module-specific usage records about utilization of the wireless communication networks 100 by the mobile apparatus 110 associated with the set 112 of the subscriber identity modules 114, 116, each usage record comprising a quantity quantifying amount of data transferred with each subscriber identity module 114, 116 and a limit setting the maximum allowed amount of data transfer for each subscriber identity module 114, 116.

Fourth, the server apparatus 140 is caused to compare 246 periodically the quantity in each usage record with the limit in the same usage record.

Fifth, if the quantity in the usage record is within a predetermined margin of the limit in the same usage record, the server apparatus 140 is caused to transmit 248, with the data communication interface 230, to the mobile apparatus 110, a command to limit data transfer speed of the subscriber identity module 112 defined by the usage record.

Sixth, the mobile apparatus 110 is caused to receive 214, with the data communication interface 220, a command to limit data transfer speed of the subscriber identity module 114, the command being a result of the comparison 246 comparing periodically a quantity quantifying amount of data transferred in a subscriber identity module-specific usage record with a limit setting the maximum allowed amount of data transfer in the same usage record, and the result of the comparison being such that the quantity in the usage record is 248 within a predetermined margin of the limit in the same usage record.

With the described six-step sequence at least one of the following advantages may be obtained: the connection set-up may be faster, the connection set-up may be more reliable, the connection may be more reliable, the connection may better match with the subscriber and/or service provider preferences. This is achieved with the service provider 170 server apparatus 140, which maintains subscriber identity module specific usage records and processes them in order to limit data transfer speed offered by the subscription(s) if required. In effect, the server apparatus 140 performs this processing for the set 112 of the subscriber identity modules 114, 116, instead of each individual operator 102, 104 having to do it separately.

In an example embodiment, the set 112 of the subscriber identity modules 114, 116 enables roaming meaning that the subscriber may obtain service outside of the home area. A user typically residing in Finland may access the local wireless communication network 100 with the first subscriber identity module 114 of the set 112, and as the user roams to London, England, s/he may access the local wireless communication network 100 with another subscriber identity module 116 of the set 112, for example.

In an example embodiment, the one or more memories 200 and the computer program code 202 are further configured to, with the one or more processors 210, cause the mobile apparatus 110 further to detect roaming of the mobile terminal, and to initiate a selection of the at least one optimal subscriber identity module 114, 116 for use by the mobile terminal. Roaming is the ability for a cellular customer to automatically make and receive voice calls, send and receive data, or access other services when travelling outside the geographical coverage area of the home network, by means of using a visited network. Roaming is technically supported by mobility management, authentication and billing procedures. If the visited network is in the same country as the home network, this is known as National Roaming. If the visited network is outside the home country, this is known as International (or Global) Roaming. If the visited network operates on a different technical standard than the home network, this is known as Inter-standard roaming. GSM Coverage Maps is a unique resource containing information supplied and approved by the members of the GSM Association. Network, services and roaming information are continually updated to reflect the evolving situation worldwide.

For example: the accessory 500 may inactivate the mobile terminal 510, and scan SIM data from the set of available subscriber identity modules 114, 116 that are located in the accessory 500. Next, the accessory 500 may ask available networks from the mobile terminal 510, whereupon the mobile terminal 510 returns the available networks to the accessory 500. The accessory 500 then selects at least one optimal subscriber identity module 114, 116 for use by the mobile terminal as the active SIM on the basis of the data relating to the subscriber identity modules 114, 116 and at least one selection ground for the subscriber identity module. After the suitable subscriber identity module 114 is selected as active, the accessory 500 instructs the mobile terminal 510 to reconnect to the network 100 with the optimal active subscriber identity module 114 such that the operator 102 is selected on the basis of the preferred roaming list of the selected subscriber identity module 114.

The selection ground for the subscriber identity module may comprise a network coverage criterion, available services criterion, quality of service criterion, costs of using the subscriber identity module criterion, location of the mobile terminal criterion etc. The various criteria may be used alone or in combination. A simple selection ground could be formulated as follows: "use the cheapest subscriber identity module 114, 116 that provides the required service at the required quality of service in the present location of the mobile terminal by network operator A if available, and if operator A is not available then by any other operator fulfilling the criteria", but this is only an example embodiment, as the selection ground may be made much simpler but also much more complex. But, as understood, the selection procedure utilizing a selection ground is augmented with the preferred roaming lists.

Next, let us study FIG. 7, which is a flow chart illustrating example embodiments of both the server apparatus 140 and the mobile apparatus 110. The operations are not strictly in chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order. In an example embodiment, the method may be implemented by an electronic apparatus, by the described server apparatus 140 and/or by the mobile apparatus 110, for example.

The operation starts in 700.

In 702, the server apparatus 140 manages, in addition to or instead of the mobile network operators 102, 104, by the service provider 170, subscriptions to the wireless communication networks 100 as specified by the set 112 of the subscriber identity modules 114, 116.

In 712, the server apparatus 140 maintains subscriber identity module-specific usage records about utilization of the wireless communication networks 100 by the mobile apparatus 110 associated with the set 112 of the subscriber identity modules 114, 116, each usage record comprising a quantity quantifying amount of data transferred with each subscriber identity module 114, 116 and a limit setting the maximum allowed amount of data transfer for each subscriber identity module 114, 116.

In 716, the server apparatus 140 compares 246 periodically the quantity in each usage record with the limit in the same usage record.

In 718, if the quantity in the usage record is within a predetermined margin of the limit in the same usage record, the server apparatus 140 transmits, to the mobile apparatus 110, a command to limit data transfer speed of the subscriber identity module 114, 116 defined by the usage record.

The operation ends in 738.

The operations 702-712-716-718 and the supplementary operations may be repeated 736 as required.

The already described example embodiments of the server apparatus 140 and the mobile apparatus 120 and the example embodiments that will be described in the following for the server apparatus 140 and the mobile apparatus 110 may be utilized to enhance the operation sequence.

In an example embodiment 708, the mobile apparatus 110 transmits, to the server apparatus 140 utilized by the service provider 170, information on the amount of the data transferred with subscriptions to the wireless communication networks 100 as specified by the set 112 of the subscriber identity modules 114, 116 obtained from mobile phone operators 102, 104 and associated with the mobile apparatus 110.

In an example embodiment of 734, the mobile apparatus 110 receives a command to limit data transfer speed of the subscriber identity module 114, the command being a result of the comparison 246 comparing periodically a quantity quantifying amount of data transferred in a subscriber identity module-specific usage record with a limit setting the maximum allowed amount of data transfer in the same usage record, and the result of the comparison being such that the quantity in the usage record is 248 within a predetermined margin of the limit in the same usage record. The predetermined margin may be defined by an absolute or a relative numeric value, for example. Let us suppose that the limit is 100 megabytes of data, in which case the predetermined margin may be defined as 10 megabytes or 10% of the limit. As the quantity of the transferred data becomes 90 megabytes, the quantity is then within the predetermined margin of the limit, and the command to limit the data transfer speed becomes necessary. The command to limit the data transfer speed may lower the data transmission speed. Let us suppose that the normal data transfer speed is 10 megabits/second, in which case the limited data transfer speed may be 1 megabits/second, for example.

In an example embodiment of 706 and 714, the server apparatus 140 receives information on the amount of the data transferred with each subscriber identity module, and updates the subscriber identity module-specific usage records with the information on the amount of the data transferred with each subscriber identity module 114, 116. This information may be received from the mobile apparatus 110, and/or utilized wireless communication network 100, and/or from the operators 102, 104.

In an example embodiment of 704, the server apparatus 140, prior to receiving the information on the amount of the data transferred with each subscriber identity module 114, 116, requests the information from the mobile apparatus 110.

In an example embodiment of 710, the information on the amount of the data transferred with each subscriber identity module 114, 116 has been updated by the mobile apparatus 110 during use of the each subscriber identity module 114, 116.

In an example embodiment of 720, if the quantity in the usage record is within the predetermined margin of the limit in the same usage record, the server apparatus 140 transmits, to the mobile apparatus 110, also a status of the comparison to be indicated for the subscriber. The status of the comparison may indicate the situation in a textual form. For example: "You have used 90 megabytes of your allowed 100 megabytes".

In an example embodiment of 722, the server apparatus 140 maintains preset instructions determining the way the status of the comparison is to be indicated for the subscriber. The preset instructions may include choice of language, instructions relating to user interface of the mobile apparatus 110 etc.

In an example embodiment of 722, 724 and 726, the server apparatus 140 receives selection information from the subscriber as regards to the preset instructions, and personalizes the preset instructions determining the way the status of the comparison is to be indicated on the basis of the received selection information.

In an example embodiment of 722 and 728, the server apparatus 140 maintains rules according to which the preset instructions are changed dynamically, the rules determining dynamic changes according to at least one of the following: a subscriber identity module-specific criterion, a subscriber-specific criterion, a time of day criterion.

In an example embodiment of 722 and 730, the server apparatus 140 maintains the preset instructions such that at least one the following is a parameter affecting the preset instructions: a type of a card containing the subscriber identity module 112, 114, a connection type as allowed by the subscriber identity module 112, 114, usage preferences for the subscriber identity module 112, 114, country of use of the subscriber identity module 112, 114, usage history of the subscriber identity module 112, 114.

In an example embodiment of 722, 730, the server apparatus 140 maintains the preset instructions such that the status of the comparison to be indicated for the subscriber also comprises instructions determining a way to top-up the subscriber identity module 114, 116 is to be indicated for the subscriber. Top-up refers to the credit of the subscriber identity module 114, 116. Especially in case of prepaid subscriber identity modules 114, 116, if the credit runs out, the subscriber identity module 114, 116 cannot access the network 100 anymore. Accordingly, the credit has to be topped-up, i.e. the user has to pay an invoice covering a sum needed to top up the credit of the subscriber identity module 114, 116.

It will be obvious to a person skilled in the art that, as technology advances, the inventive concept can be implemented in various ways. The invention and its embodiments are not limited to the example embodiments described above but may vary within the scope of the claims.

The invention claimed is:

1. A server apparatus comprising:
a data communication interface;
one or more processors; and
one or more memories including computer program code;
the one or more memories and the computer program code configured to, with the one or more processors, cause the server apparatus at least to:
manage, instead of mobile network operators, by a service provider, subscriptions to wireless communication networks as specified by a set of subscriber identity modules accommodated in a personal portable container communicating with a mobile terminal by a short-range radio link;
maintain subscriber identity module-specific usage records about utilization of the wireless communication networks by the mobile terminal associated with the set of the subscriber identity modules, each usage record comprising a quantity quantifying amount of data transferred with each subscriber identity module and a limit setting the maximum allowed amount of data transfer for each subscriber identity module;
receive from the mobile terminal, with the data communication interface, information on the amount of the data transferred with each subscriber identity module;
update the subscriber identity module-specific usage records with the information on the amount of the data transferred with each subscriber identity module;
compare periodically the quantity in each usage record with the limit in the same usage record, and
if the quantity in the usage record is within a predetermined margin of the limit in the same usage record, transmit, with the data communication interface, to the mobile apparatus, a command to limit data transfer speed of the subscriber identity module defined by the usage record; and detect a roaming of the mobile terminal, and select the cheapest subscriber identity module to provide a required service, at a required quality of service and at a required data transfer rate, from among the set of the subscriber identity modules, taking into account a location of the mobile terminal and the quantities and the limits defined in the usage records for each subscriber identity module.

2. The server apparatus of claim 1, wherein the one or more memories and the computer program code are further configured to, with the one or more processors, cause the server apparatus further to:

prior to receiving the information on the amount of the data transferred with each subscriber identity module, request the information from the mobile terminal.

3. The server apparatus of claim 2, wherein the information on the amount of the data transferred with each subscriber identity module has been updated by the mobile terminal during use of the each subscriber identity module.

4. The server apparatus of claim 1, wherein the one or more memories and the computer program code are further configured to, with the one or more processors, cause the server apparatus further to:

if the quantity in the usage record is within the predetermined margin of the limit in the same usage record, transmit, with the data communication interface, to the mobile terminal, also a status of the comparison to be indicated for the subscriber.

5. The server apparatus of claim 4, wherein the one or more memories and the computer program code are further configured to, with the one or more processors, cause the server apparatus further to:

maintain preset instructions determining the way the status of the comparison is to be indicated for the subscriber.

6. The server apparatus of claim 5, wherein the one or more memories and the computer program code are further configured to, with the one or more processors, cause the server apparatus further to:

receive selection information from the subscriber as regards to the preset instructions; and personalize the preset instructions determining the way the status of the comparison is to be indicated on the basis of the received selection information.

7. The server apparatus of claim 4, wherein the one or more memories and the computer program code are further configured to, with the one or more processors, cause the server apparatus further to:

maintain rules according to which the preset instructions are changed dynamically, the rules determining dynamic changes according to at least one of the following: a subscriber identity module-specific criterion, a subscriber-specific criterion, a time of day criterion.

8. The server apparatus of claim 4, wherein the one or more memories and the computer program code are further configured to, with the one or more processors, cause the server apparatus further to:

maintain the preset instructions such that at least one the following is a parameter affecting the preset instructions: a type of a card containing the subscriber identity module, a connection type as allowed by the subscriber identity module, usage preferences for the subscriber identity module, country of use of the subscriber identity module, usage history of the subscriber identity module.

9. The server apparatus of claim 4, wherein the one or more memories and the computer program code are further configured to, with the one or more processors, cause the server apparatus further to:

maintain the preset instructions such that the status of the comparison to be indicated for the subscriber also comprises instructions determining a way to top-up the subscriber identity module is to be indicated for the subscriber.

10. The server apparatus of claim 1, wherein the set of the subscriber identity modules comprises prepaid subscriber identity modules obtained from the mobile phone operators.

* * * * *